US012754829B2

(12) United States Patent
S et al.

(10) Patent No.: US 12,754,829 B2
(45) Date of Patent: Oct. 6, 2026

(54) USER INTERFACE (UI) BOUND ODATA AUTOMATION WITH ADVANCED DATA MAPPING ALGORITHIM

(71) Applicant: SAP SE, Walldorf (DE)

(72) Inventors: Shanavas Madeen S, Krishnagir (IN); Naveen V, Hariharapura (IN); Ravikanth Malipeddu, Bangalore (IN)

(73) Assignee: SAP SE, Walldorf (DE)

( * ) Notice: Subject to any disclaimer, the term of this patent is extended or adjusted under 35 U.S.C. 154(b) by 406 days.

(21) Appl. No.: 18/302,606

(22) Filed: Apr. 18, 2023

(65) Prior Publication Data

US 2024/0354238 A1 Oct. 24, 2024

(51) Int. Cl.
*G06F 11/3668* (2025.01)

(52) U.S. Cl.
CPC ...... *G06F 11/3688* (2013.01); *G06F 11/3684* (2013.01)

(58) Field of Classification Search
CPC ............................................ G06F 11/36-3698
See application file for complete search history.

(56) References Cited

U.S. PATENT DOCUMENTS

| | | | | |
|---|---|---|---|---|
| 9,767,008 | B2 * | 9/2017 | Harden | G06F 11/3684 |
| 10,452,522 | B1 * | 10/2019 | Arguelles | G06F 11/3684 |
| 10,552,299 | B1 * | 2/2020 | Surace | G06F 11/3684 |
| 11,340,968 | B1 * | 5/2022 | Malamut | G06F 9/547 |
| 11,561,886 | B2 * | 1/2023 | Bhandarkar | G06F 11/3684 |
| 2015/0254171 | A1 * | 9/2015 | Harden | G06F 11/3684 717/124 |
| 2021/0089435 | A1 * | 3/2021 | Bhandarkar | G06F 11/3684 |
| 2022/0350731 | A1 * | 11/2022 | Ding | G06F 11/3684 |

* cited by examiner

*Primary Examiner* — Todd Aguilera
(74) *Attorney, Agent, or Firm* — Buckley, Maschoff & Talwalkar LLC

(57) ABSTRACT

According to some embodiments, systems and methods are provided to test a complete application including both User Interface (UI) and Application Programming Interface (API) automation. An automate for an application under test is retrieved. The application under test includes a user interface displaying at least one web object. The automate is executed. Execution of the automate further comprises: identifying at least one Open Data Protocol (OData) call in the automate; mapping at least one test data value for the web object to a corresponding parameter in the OData call; and executing the at least one OData call with the mapped at least one test data value. Execution of the at least one OData call outputs a response. Numerous other aspects are provided.

17 Claims, 10 Drawing Sheets

500

```
function  new XHR() {
          var xhr = new oldHXR ();
          xhr.addEventListener ('readystatechange', stateChangeHandler);
          return xhr
}
for (prop in old HXR)
          newXHR[prop] = oldHXR [prop]
wind.XMLHttpRequest = newHXR
```

FIG. 5

600

```
{
        "batchno": 16,
        "method": "POST",
        "entitySet": "https:xxxx/odata/xxxx/batch.
        "payload":{
                "DeliveryCreationDate": "\\/Date (02032023)\\/",
                "GoodsIssueDate": "\\/Date (04052023)\\/",
603             "SDDocument": "6640458",   602
                "ShipToParty": "XXX",
                "ShipToPartyName": "XXX",
        }
        "response":{
                "DeliveryCreationDate": "\\/Date (02032023)\\/",
                "GoodsIssueDate": "\\/Date (04052023)\\/",
                "SDDocument": "6640458",
                "ShipToParty": "XXX",
                "ShipToPartyName": "XXX",
                "DocRelationshipUUID": "4329238LEEDA29",   604
        }
        "url": "C_OutboundDeliveryCreate...",
}
```

FIG. 6A

600

```
{
        "batchno": 17,
        "method": "GET",
        "entitySet": "https:xxxx/odata/xxxx/batch.
        "payload": "",
        "response": {
                "results": [{
                "DocRelationshipUUID": "",
                "CollectiveProcessing": "10875",        606
                "SSDocument": ""
                "NoOfIssues": 0,
                "NoOfDelvieries": 0
                "LogCreateDate": "\\/Date(09042023)\\/",
                }]
        "url": "C_OutboundDeliveryCreationResponseXXXXXXX "4329238LEEDA29"",
}
                                                                608
```

FIG. 6B

600

```
{
        "batchno": 20,
        "method": "GET",
        "entitySet": "https:xxxx/odata/xxxx/batch.
        "payload": "",
        "response": {
                "results": [{
                "CollectiveProcessing": "10875",
                "SSDocument": "6640458"
                "NoOfIssues": 0,
                "NoOfDelvieries": 0
                "LogCreateDate": "\\/Date(09042023)\\/",
                }]
        "url": "C_CollectiveProcessing: "10875" http_CollectiveProcessigDocument/
clientsXXX",

}
```

610

FIG. 6C

USER INTERFACE (UI) BOUND ODATA AUTOMATION WITH ADVANCED DATA MAPPING ALGORITHIM

BACKGROUND

Many organizations are increasingly dependent on software user interface (UI) applications, executed on-premise or in the cloud, that are developed to address their needs. The UI applications may be tested by automation tools to verify functional and/or non-functional requirements via automated test scripts. The automation tool may be an application/software that is separate from the software being tested to control the execution of test scripts, and the comparison of actual outcomes with predicted outcomes. Graphical User Interface (GUI) testing (referred to herein as "UI testing") and Application Programming Interface (API) testing are two examples of automation techniques for functional testing of an application. Functional testing is often UI driven and testing techniques often simulate the actions of an end user physically using the application by interacting web objects (e.g., elements on a web page including text, graphics, URLs and scripts). An API is essentially an interface with a set of rules that dictate how two machines/software components talk to each other (e.g., a cloud application communicating with a server, servers pinging each other, applications interacting with an operating system, etc.) API testing checks that the API is able to perform CRUD (Create, Read, Update, Delete) operations of the application with respect to a back-end.

While both UI and API automation may test functional aspects of the application, they may vary with respect to processing and storing of data. UI automation often consumes more resources and time than API automation, as UI automation is dependent on both GUI and application processing in the backend, and the communication between them. For example, with UI automation, the application is opened, and each action is performed, which requires resources, the availability of the system (e.g., the application's user interface under test needs to be available and running), and an established connection between the front end (e.g., what the end user secs), which may be referred to as the "UI layer," and the back end (to provide a response to the user interaction with the front end). API automation, on the other hand, directly communicates with the back end to obtain the response without communication with a front-end, providing a faster determination of whether the application is functioning properly. As the testing is different, there may be instances where the API testing is successful because it interacts directly with the back end, while the UI testing is unsuccessful because it interacts with both the UI layer and the back end, and the UI testing may fail due to the dependency on the UI layer. Failure in UI automation may not provide information about the functionality/service or the UI error. Further, while failure in API automation may provide clear information about the error of the logic, the API automation may not access a user-provided data integrated test for each service associated with the application, and therefore may not test all of the underlying services bound with UI controls in the application. These discrepancies in the testing outcomes may provide an uncertainty as to whether the application is functioning properly. Given that UI testing may be slower and may be more prone to errors, it may be more desirable to test the functionality of an application using API testing. However, using API testing alone does not test the complete application exactly how an end user interacts with the application.

Systems and methods are desired which make it easier to test the complete application.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 5 is an example of event listener code according to some embodiments.

FIG. 6A is a display of mapping logic according to some embodiments.

FIG. 6B is a display of mapping logic according to some embodiments.

FIG. 6C is a display of mapping logic according to some embodiments.

Figure 1:
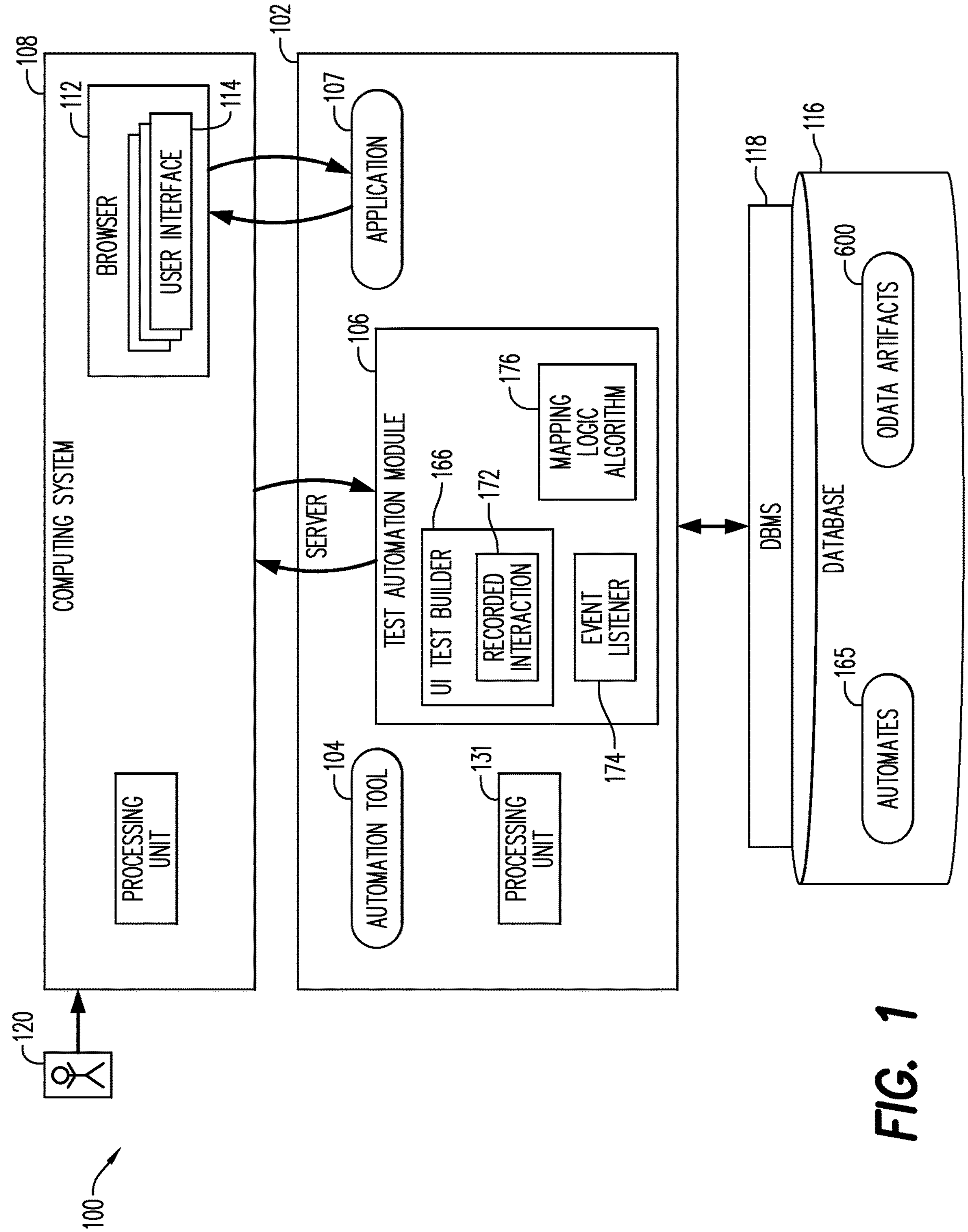
FIG. 1 is a block diagram of an architecture according to some embodiments.

Throughout the drawings and the detailed description, unless otherwise described, the same drawing reference numerals will be understood to refer to the same elements, features and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein. It should be appreciated that in development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

As described above, an automation tool may be used to verify functional and/or non-functional requirements of a UI application via automated test scripts. As used herein, the terms "automated test script," "automate", "test," "script" and "automation" may be used interchangeably. As part of the development of a UI application, UI bound APIs are also created. The end-user may interact with the UI, which in turn accesses these APIs to respond to the end-user interaction with the UI. While these APIs may be accessed using the UIs, the end-user cannot directly interact with the API. As such, it is desirable to test both the end-user's interaction with the UI, as well as the ability of the APIs to interact with data.

A UI automate may simulate, or mimic, an end user's interaction with the UI application, and in particular, the web objects in the application. An API automate may test the UI application's ability to perform CRUD operations. As further described above, while the UI automate tests the application as the user would interact with the application, it is slower than API automates since the UI automate interacts with both the UI component and the API component. The UI automate may include many calls to transmit data to and from the user interface, and may internally activate related linked APIs, while with the API automate it may take just one call to send all of the data and retrieve the response. Additionally, an error during UI testing may be the result of an error with either the UI component or the API component, and it may be ambiguous which component is the cause of the error, making troubleshooting more time consuming and costly. As such, conventional UI test automation is lacking in terms of optimization of the execution time for a UI automation and conventional API test automation is lacking in terms of testing the underlying services bound with UI controls in an application.

Embodiments provide for a UI-less layer functional automation for applications through a REST-based Open Data (OData) protocol. The UI-less automate may test the functionality of the operation of the back end response to interactions with the user interface. During creation of the UI automate, user interactions with the UI and underlying API (OData) calls may be captured, and the features related to the UI layer (e.g., how an object is rendered on a screen), but unrelated to Casscading Style Sheet (CSS) filter operations (e.g., styling of data element on the UI per a predefined format), may be filtered out, such that the automate may test the user interactions without the UI layer. Embodiments provide for testing of the end-user interactions with the UI of the application via an OData protocol instead of reliance on the combined UI layer and back end. Embodiments include the integration of dependent sequential OData requests and user defined data for an automate. As a result, embodiments provide an automation that may be performed with the same speed as API testing and provide a less ambiguous indication of the source of an error during testing, while testing the UI functionality. Additionally, by avoiding interactions with the UI layer (e.g., by only interacting with the back end), less resources are used and the bandwidth of the system may be increased as compared to conventional UI testing. For example, while a conventional UI test for an end-to-end process may take 4.5 hours to execute, the UI-boundless test of the same associated API's may take 26 minutes. Embodiments also do not require an end user to understand the technical details of OData, its properties or chaining of the requests. Embodiments provide for the autonomous injection of user-defined data into OData structures, sequencing and mapping data from previous response. Embodiments do not require any additional efforts from the development team to publish these API's.

FIG. 1 is a block diagram of an architecture 100 according to some embodiments. The illustrated elements of architecture 100 and of all other architectures depicted herein may be implemented using any suitable combination of computing hardware and/or software that is or becomes known. Such combinations may include one or more programmable processors (microprocessors, central processing units, microprocessor cores, execution threads), one or more non-transitory electronic storage media, and processor-executable program code. In some embodiments, two or more elements of architecture 100 are implemented by a single computing device, and/or two or more elements of architecture 100 are co-located. One or more elements of architecture 100 may be implemented using cloud-based resources, and/or other systems which apportion computing resources elastically according to demand, need, price, and/or any other metric.

Architecture 100 includes a backend server 102 including a remote cloud-based automation tool 104 and a remote cloud-based application 107, a test automation module 106, a local computing system 108 including, a browser 112 and a user interface 114 of the application under test. It is noted that while the automation tool 104 is shown herein as available from the backend server, with automates being run therefrom, in other embodiments, the automation tool 104 may be installed in the local computing system as a rendering of automation tool on the backend server. The architecture 100 may also include a database 116, a database management system (DBMS) 118, and a client/user 120. As used herein, the terms "client", "user" and "end-user" may be used interchangeably.

The backend server 102 may include applications 107. Applications 107 may comprise server-side executable program code (e.g., compiled code, scripts, etc.) executing within the backend server 102 to receive queries/requests from clients 120, via the local computing system 108, and provide results to clients 120 based on the data of database 116, and the output of the test automation module 106. A automate author may access, via the local computing system 108, the test automation module 106 executing within the server 102, to generate an automate, as described below.

The server 102 may provide any suitable interfaces through which users 120 may communicate with the test automation module 106 or applications 107 executing thereon. The server 102 may include a Hyper Text Transfer Protocol (HTTP) interface supporting a transient request/response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface.

Local computing system 108 may comprise a computing system operated by local user 120. Local computing system 108 may comprise a laptop computer, a desktop computer, or a tablet computer, but embodiments are not limited thereto. Local computing system 108 may consist of any combination of computing hardware and software suitable to allow system 108 to execute program code to cause the system 108 to perform the functions described herein and to store such program code and associated data.

Generally, computing system 108 executes one or more of applications to provide functionality to user 120. Applications may comprise any software applications that are or become known, including but not limited to data analytics applications. As will be described below, applications may comprise web applications which execute within a web browser 112 of system 108 per remote cloud-based applications 107 to provide desired functionality. User 120 may instruct system 108, as is known, to execute one or more of applications 107 under test and an associated automate 165 application for the application under test. The user 120 may interact with resulting displayed user interfaces 114 output from the execution of applications 107, to analyze the functionality of the application under test.

The automation tool 104 may access data in the database 116 and then may reflect/show that information on a user interface 114. The automation tool 104 may fetch the data from the database 116 so that it is provided at runtime. While discussed further below, the database 116 may store data representing the automates 165 and other suitable data. The automates 165 may be used to test the application under test. Execution of the automate 165 may include performance of activities in a sequence designated by the test automation module 106 using a given payload, as described further below. Database 116 represents any suitable combination of volatile (e.g., Random Access Memory) and non-volatile (e.g., fixed disk) memory used by system 108 to store the data.

The test automation module 106 may include a UI test builder 166, and an event listener 174. The test builder 166 may be any suitable user interface test builder application for authoring and/or debugging UI automates. The event listener 174 may be a code snippet that captures OData initiated by the application, as described further below.

One or more applications 107 executing on backend server 102 or local computing system 108 may communicate with DBMS 118 using database management interfaces such as, but not limited to, Open Database Connectivity (ODBC) and JAVA® Database Connectivity (JDBC) interfaces. These types of applications 107 may use Structured Query Language (SQL) to manage and query data stored in database 116.

DBMS 118 serves requests to store, retrieve and/or modify data of database 116, and also performs administrative and management functions. Such functions may include snapshot and backup management, indexing, optimization, garbage collection, and/or any other database functions that are or become known. DBMS 118 may also provide application logic, such as database procedures and/or calculations, according to some embodiments. This application logic may comprise scripts, functional libraries and/or compiled program code. DBMS 118 may comprise any query-responsive database system that is or becomes known, including but not limited to a structured-query language (i.e., SQL) relational database management system.

Backend server 102 may provide application services (e.g., via functional libraries) which applications 107 may use to manage and query the data of database 116. The application services can be used to expose the database data model, with its tables, hierarchies, views and database procedures, to clients. In addition to exposing the data model, backend server 102 may host system services such as a search service.

Database 116 may store data used by at least one of: applications 107 and the test automation module 106. For example, database 116 may store the user-defined data which may be accessed by the test automation module 106 during execution thereof.

Database 116 may comprise any query-responsive data source or sources that are or become known, including but not limited to a structured-query language (SQL) relational database management system. Database 116 may comprise a relational database, a multi-dimensional database, an extensible Markup Language (XML) document, or any other data storage system storing structured and/or unstructured data. The data of database 116 may be distributed among several relational databases, dimensional databases, and/or other data sources. Embodiments are not limited to any number or types of data sources.

Presentation of a user interface as described herein may comprise any degree or type of rendering, depending on the type of user interface code generated by the backend server 102/local computing system 108.

For example, a client 120 may execute a Web Browser to request and receive a Web page (e.g., in HTML format) from a website application 107 of backend server 102 to provide the UI 300 via HTTP, HTTPS, and/or WebSocket, and may render and present the Web page according to known protocols.

Figure 2:
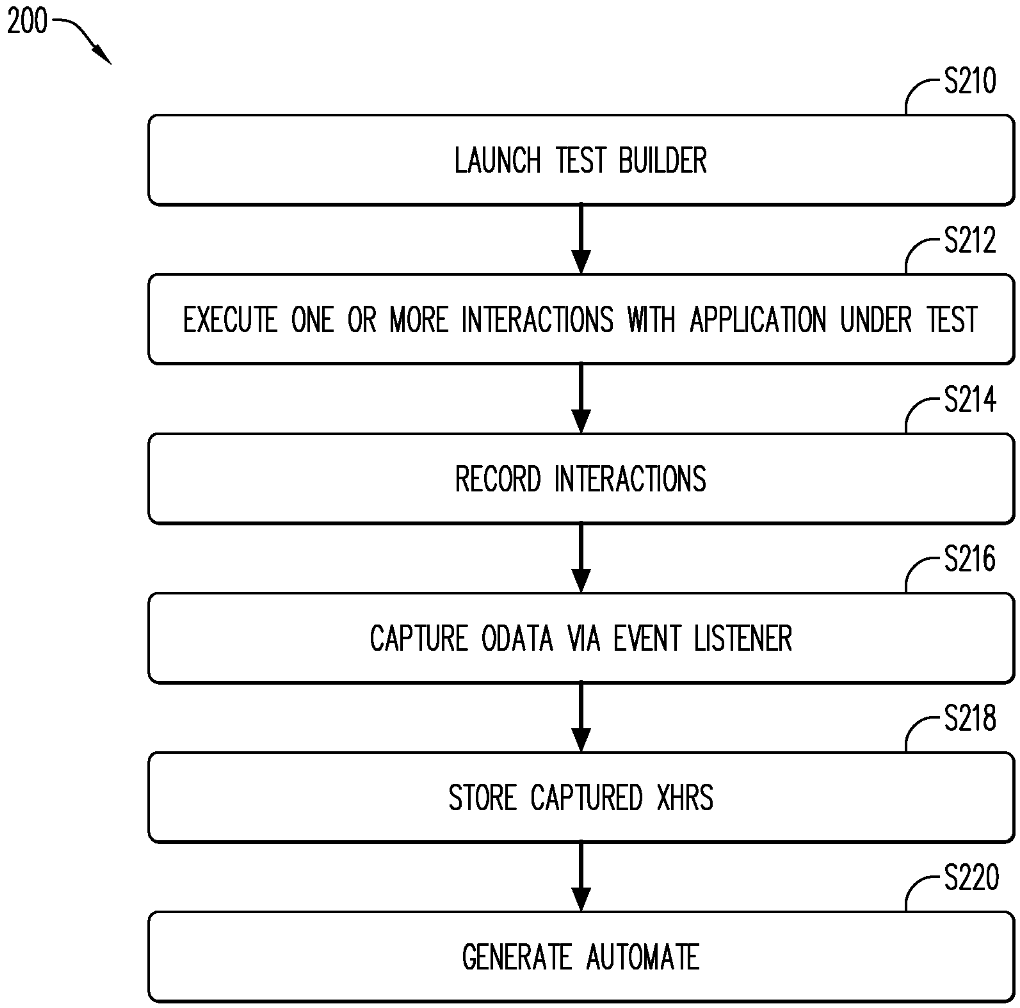
FIG. 2 is a flow diagram of a process according to some embodiments.

FIGS. 2 and 6 illustrate a method 200 of generating an automate 165, and a method 700 of executing the automate 165, respectively, in accordance with an example embodiment. For example, the method 200/700 may be performed by a database node, a cloud platform, a server, a computing system (user device), a combination of devices/nodes, or the like, according to some embodiments. In one or more embodiments, the computing system 108 or backend server 102 may be conditioned to perform the process 200/700, such that a processing unit 131 (FIG. 1) of the system 100 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S210, a UI test builder 166 is launched along with the application under test 107. The content of the application under test 107 may be loaded based on a plurality of network calls.

Then, in S212, one or more interactions with an application under test are executed. Pursuant to some embodiments, an automate author may interact with the web objects on the user interface and perform a sequence of interactions (e.g., click on a field, enter data, select a control, export data, import data etc.) they want to test in the application under test. In S214 the UI test builder 166 runs in the background of the application under test and records the interactions 172. As part of the recorded interactions 172, the UI test builder 166 also captures the UI related controls, including network calls, labels, IDs, other CSS properties etc. of the application under test.

Figure 3:
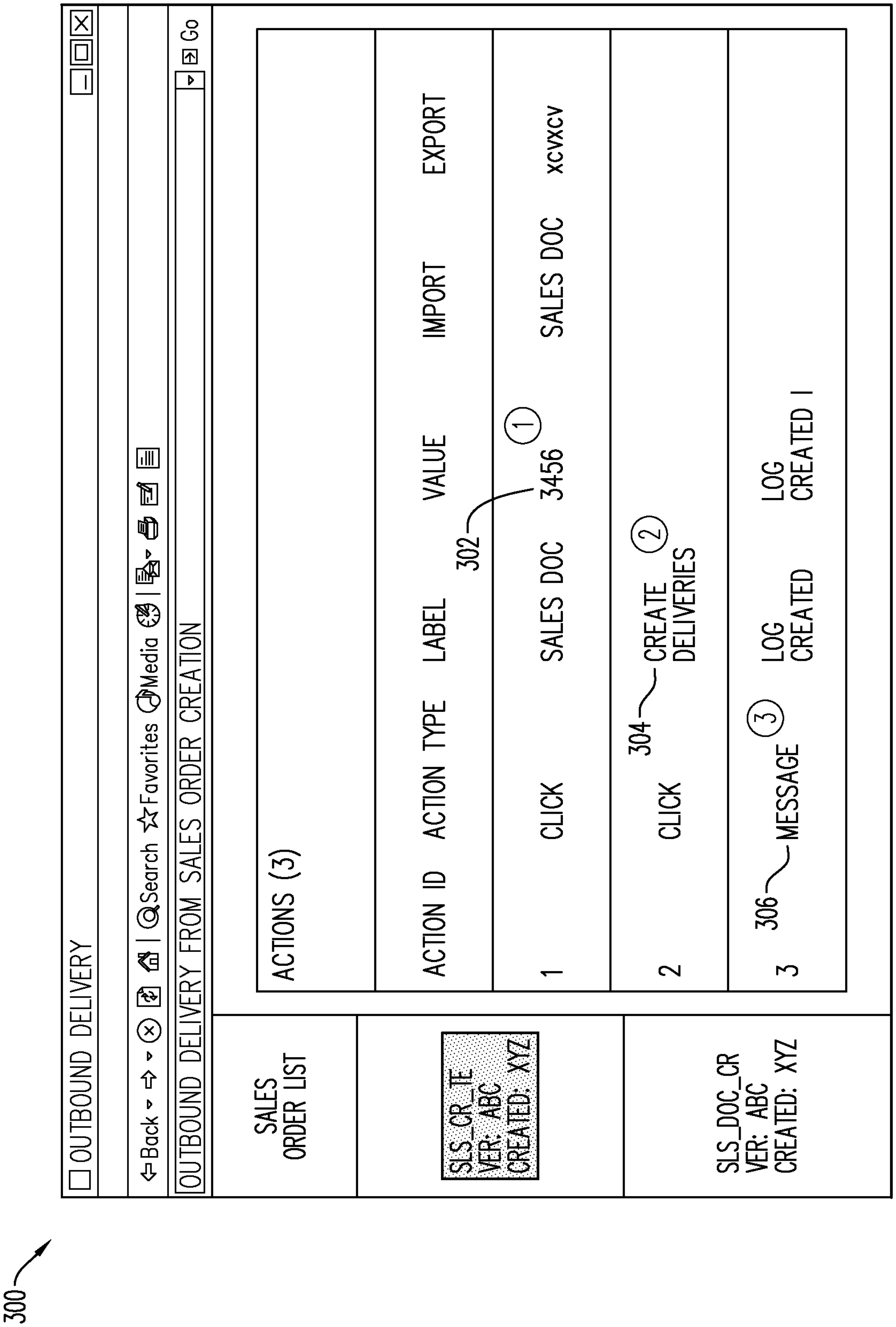
FIG. 3 is a diagram illustrating a user interface according to some embodiments.

As a non-exhaustive example, FIG. 3 is a user interface 300 provided to the automate author for testing an outbound delivery application. In particular, the automate being authored may test the creation of a delivery order. A first interaction may include inputting a sales document number value of an existing sales document they want to create the delivery for in a value field 302 (indicated by "1"). A second interaction may include clicking on "Create Delivery" control 304 (indicated by "2"). A third interaction may include checking on a "message" control 306 to confirm the delivery has been created (indicated by "3") and a delivery number has been generated.

Figure 4:
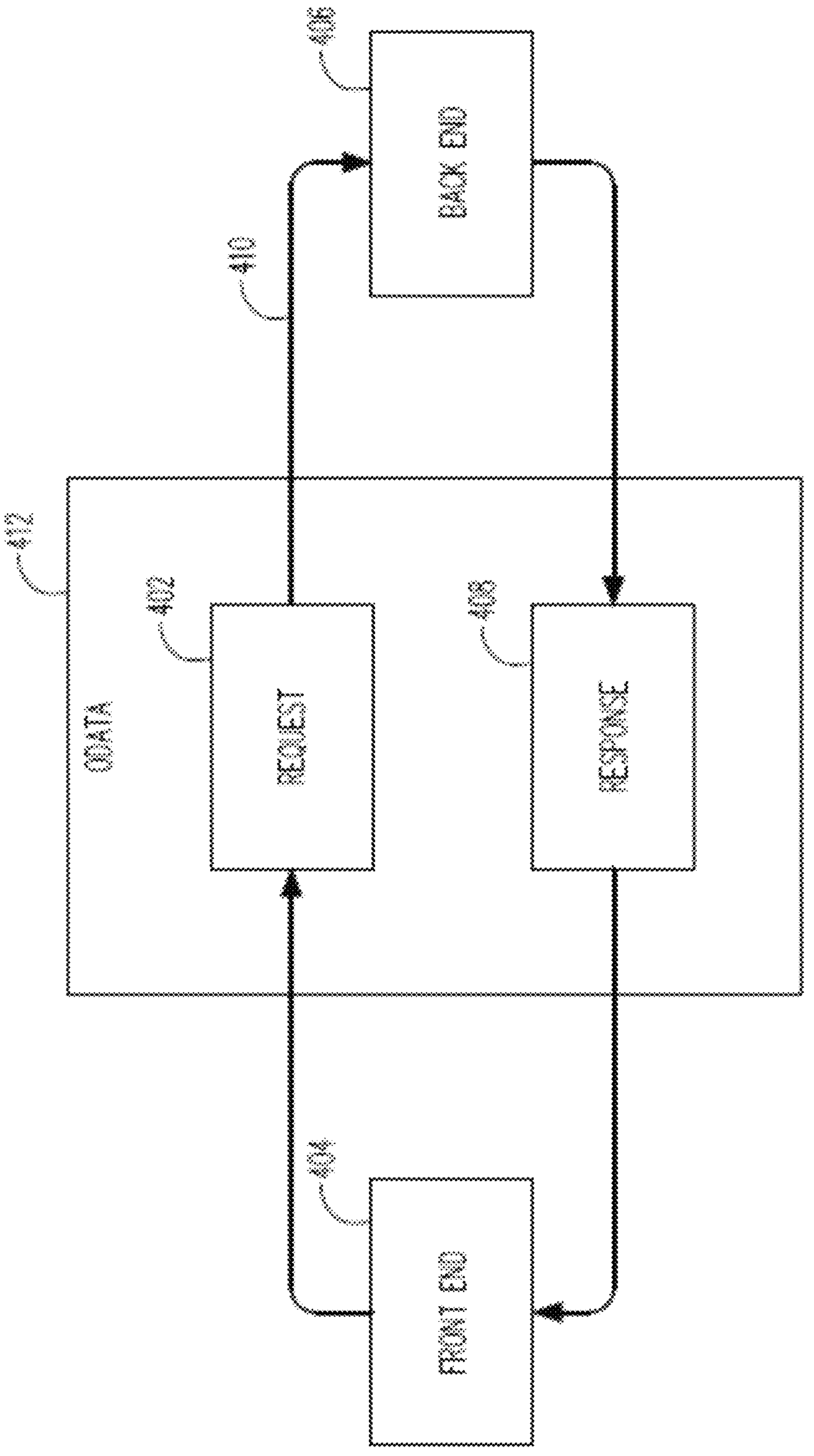
FIG. 4 is a block diagram of an architecture according to some embodiments.

For each user interaction or group of user interactions, a request 402 (FIG. 4) is sent from a front end 404 (FIG. 4) of the system (e.g., information on the software and/or hardware that is part of a user interface), to a backend 406 of the system to execute the request 402. The request 402 may be plain text/information and may contain no objects on its own.

One or more end user interactions received by an application at the front end 404 may initiate an OData call 410. The OData call may represent received user-defined data and other data triggered by the user interaction. The data provided by the end user and the other data triggered by the user interaction is converted into the request 402. A payload for the request ("request payload") may be formed as the OData call per OData protocol 412 and sent to the back end 406 for processing. OData calls may be referred to herein as "UI bound calls." The UI bound calls 410 may be initiated by the application under test when the application receives the interaction from the end user. The received OData call 410 is processed in the back end 406, generating the response 408. The response 408 is then sent back to front end 404, where it is rendered and displayed on the UI to show the results of user interactions in an end user understandable format. The response 408 may include the CSS file including display information. The display information may include, but is not limited to, a layout (e.g., position and spacing) of the text and images on the page, tables, etc.

During recordation of the interactions, an event listener 174 may be attached to the automation tool. The event listener 174 may be a code snippet 500 (FIG. 5) that captures XHRs (OData) initiated by the application in S216. By capturing the XHR data, this filters out non-OData calls (e.g., CSS calls) in the request that are only relevant for the user interface and not relevant for retrieving data from the back end 406 that represents the user interaction. The captured XHR may include the OData request and the response. When there is any change in a request state (e.g., an interaction is executed), it invokes a user-defined function (stateChangeHandler). Certain attributes, including request URL, payload, response and entity set, may be recorded and stored for later processing once the status of the XHR request changes to "DONE".

As described above, automation of the test may be based on a particular flow of interactions whereby a series of tasks based on the interactions may be completed in a particular order. Continuing with the above example, the sales document value is needed to create the delivery, as the delivery control 304 may not be executed without the sales document value. Pursuant to some embodiments the test automation module 106 may create internal dependencies between the OData APIs triggered by the series of interactions (e.g., the response from API 'n' serves as a key for API 'n+1') such that the response coming from a previous call is mapped, via a mapping logic algorithm 176, to the upcoming request based on the captured XHR data. Pursuant to some embodiments, the receipt of the response at the OData call from the previous call by the automation tool may initiate execution of the next OData call. The mapping logic algorithm 176 describes the URL being accessed and information about the requests and calls, as well as the response provided from making the call. One or more calls may be included in a batch request. As used herein, a batch request may allow grouping of multiple operations/change sets, as described by OData calls, for example, into a single HTTP request payload.

FIGS. 6A-6C display mapping logic of the previous calls to upcoming requests in the form of OData Artifacts (600) recorded from XHR calls for the outbound delivery application. With respect to the OData calls, the delivery process described above may be initiated with a Sales Delivery (SD) document. It is noted that in addition to the mapping and generation of interim data that supports the user interaction but is not provided to a user, embodiments also map data expected to be input by the user. For example, the user inputs a sales document number, and the number is the input 602 to the service call 603 SDDocument, as shown in FIG. 6A, and the sales document input may be mapped to the "create delivery" control. When the "Create Delivery" control is clicked, a plurality of calls is triggered. For example, a temporary document with the key called "DocRelationshipUUID" is generated as a first call 604. This temporary document is saved, and the saving triggers the generation of another object—in this case a "Collective Processing" number, which is a second call 606 (FIG. 6B), such that receipt of the response of the first OData call received by the automation tool initiates execution of the second OData call. In this case, the "DocRelationshipUUID" may be further used to retrieve an object called "CollectiveProcessing" having an associated identifier (ID). A URL is generated from the "CollectiveProcessing" ID to input the associated ID to the DocRelationshipUUID as a third call 608. Then, using the produced "CollectiveProcessing" ID, the next call is made to output the final delivery number as a fourth call 610 (FIG. 6C), which may be imported to the Sales Document. It is noted that the output of these calls (e.g., the DocRelationshipUUID, Collective Processing ID, etc.) will not be viewed by the user on the UI, but they may be involved in the execution of the request. As described by this example, the previous response is mapped to the next call e.g., the document relationship UUID came as a previous response and is mapped to the next call of Collective Processing. This series of multiple calls may be executed to address the single user interaction of creating a delivery number.

Pursuant to some embodiments, the test automation module 106 may also create mappings of user input data to non-sequential service calls. For example, the end-user may provide data that is not just being used by one call, but may be used by multiple (e.g., ten) calls. As such, this single input data may be mapped to ten calls and then may be input to the ten calls before each call is executed.

It is noted that during the authoring of the automate 165, the calls are captured and the mapping dependencies are created to place the calls in a sequential order, binding the calls together via the output and inputs. During execution of the automate the mapping is relied upon to replace the values with appropriate data to initiate the calls.

Turning back to the process 200, the captured OData Artifacts 600 are stored in a database 116 in S218.

The test builder 166 generates the automate 165 in S220. The generated automate 165 includes data to execute the automate both in the UI mode and in the UI-less mode (using stored OData Artifacts 600)

Figure 7:
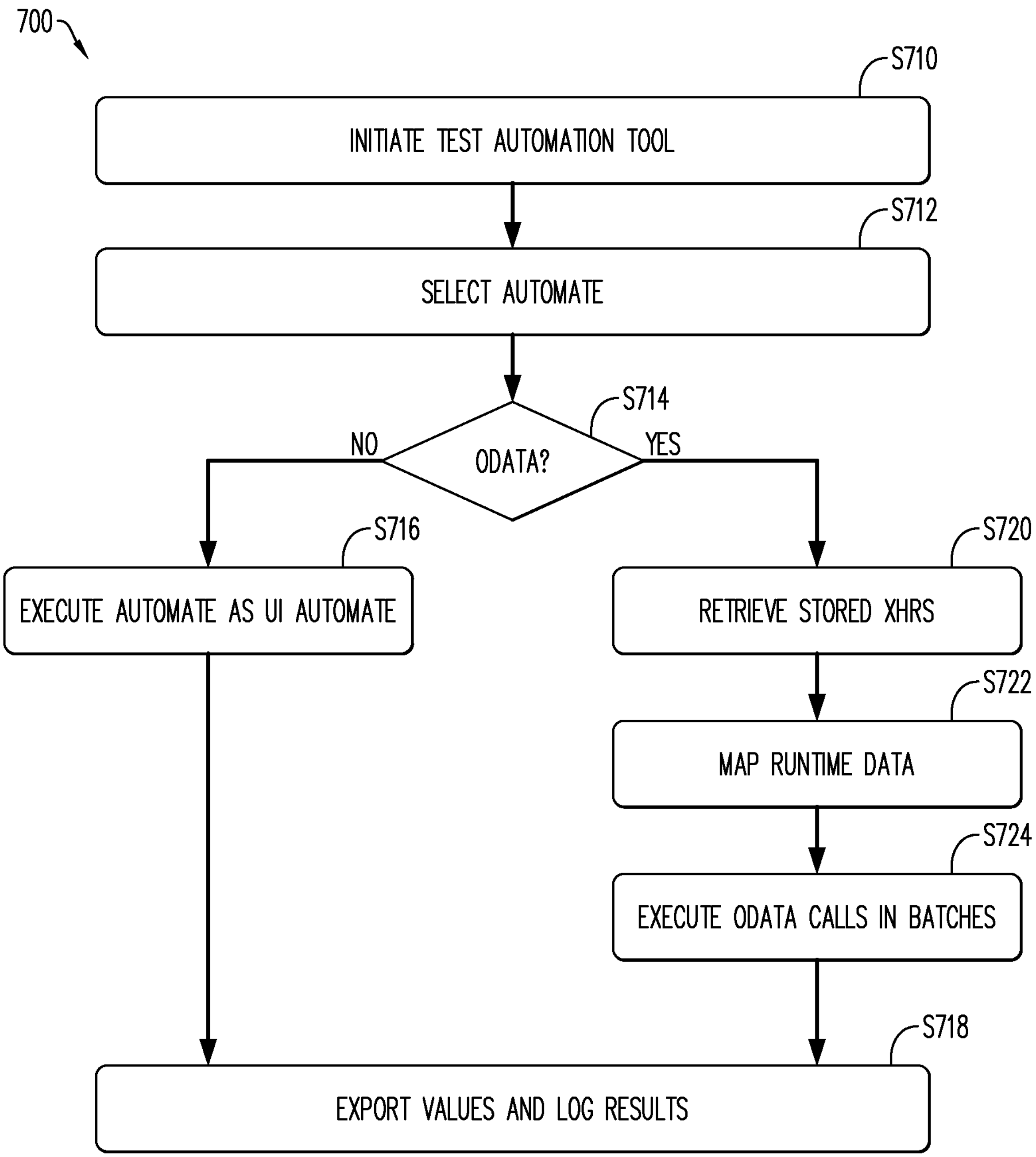
FIG. 7 is a flow diagram of a process according to some embodiments.

FIG. 7 describes a method 700 of executing the automate 165. Initially, at S710, the test automation tool 104 is initiated. Then at S712, an automate 165 is selected for execution and a test data file linked to the selected automate is retrieved. Next in S714, it is determined whether the automate 165 includes an OData call. In one or more embodiments, the test automation tool 104 may determine the automate includes OData by identifying OData Artifacts 600 in the automate.

In a case it is determined at S714 that the automate does not include OData, the process 700 proceeds to S716 and the automate is executed as a UI automate. Then in S718 the output of the automate is exported for display on a user interface, and the output is logged for further view.

In a case it is determined at S714 that the automate does include OData, the process proceeds to S720 and the stored OData Artifacts 600 including the requests and responses are retrieved. The runtime data values (e.g., the test data) from the test data file is mapped to the OData Artifacts, and in particular a corresponding parameter in the OData call, in S722 via a XHR mapping logic algorithm 176. Continuing with the example described above, the document number is mapped to DocRelationshipUUID.

Next, in S724, the OData calls are executed in batches with the mapping. For example, a first batch is executed whereby a response is generated, the response is temporarily stored (e.g., in a runtime storage) and then the temporarily stored response is mapped to an upcoming request in another batch (e.g., second, third, fourth, etc.). The upcoming batch that will receive the temporarily stored response may not sequentially follow the batch producing the response. For example, the automate may include three batches (batch 1, batch 2, batch 3). A response is generated by executing batch 1. This response is temporarily preserved as input for batch 3, not batch 2. Alternatively, the temporarily preserved batch may be stored for a batch that sequentially follows the batch producing the response. For example, the response generated by executing batch 1 is temporarily preserved as input for batch 2. The process 700 then proceeds to S718 and the output of the automate is exported for display on a user interface, and the output is logged for further view.

Figure 8:
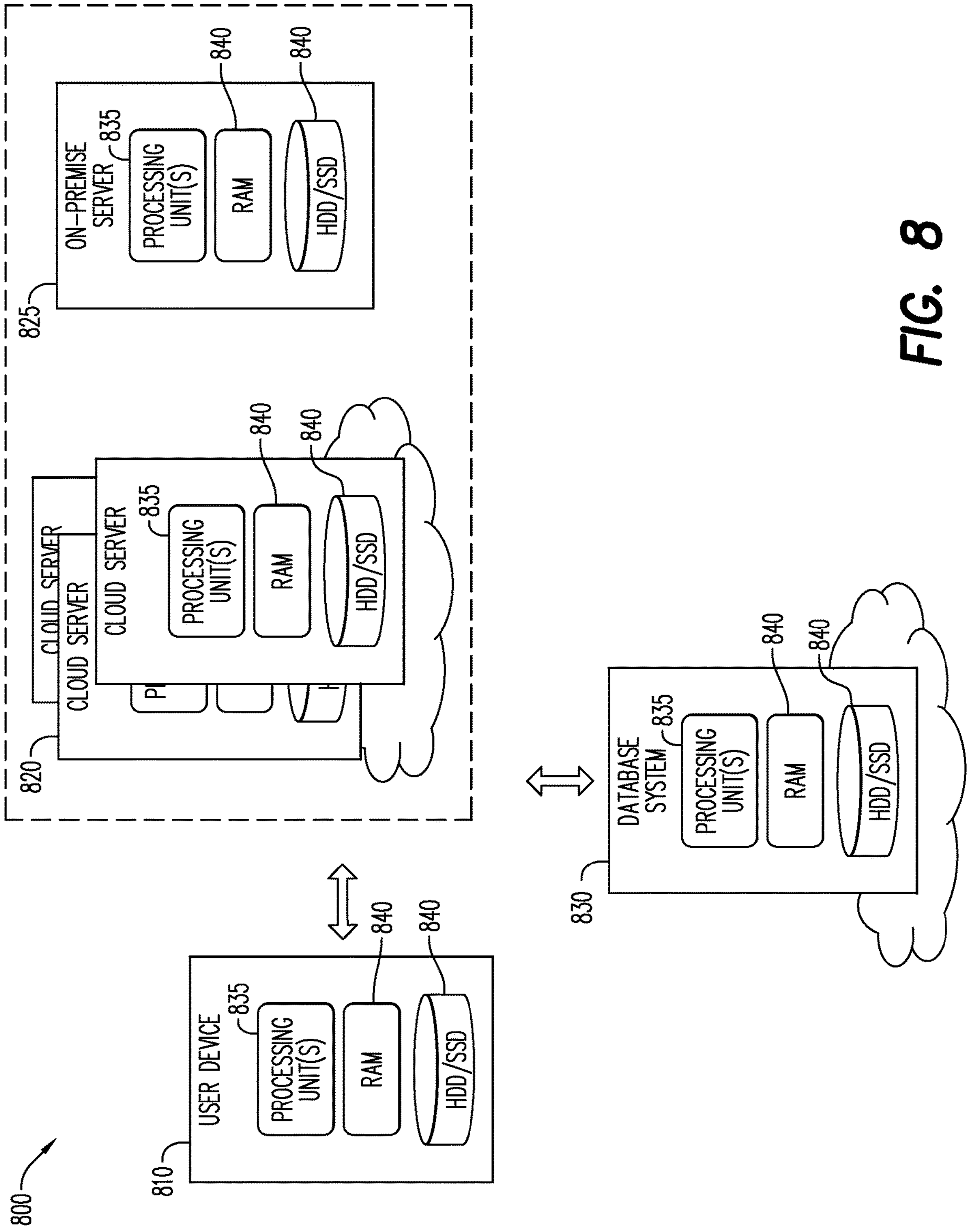
FIG. 8 is a block diagram of a cloud-based database deployment architecture according to some embodiments.

FIG. 8 illustrates a cloud-based database deployment 800 according to some embodiments. The illustrated components may reside in one or more public clouds providing self-service and immediate provisioning, autoscaling, security, compliance and identity management features.

User device 810 may interact with applications executing on one of the cloud application server 820 or the on-premise application server 825, for example via a Web Browser executing on user device 810, in order to create, read, update and delete data managed by database system 830. Database system 830 may store data as described herein and may execute processes as described herein to cause the execution of the test automation module 106 for use with the user device 810. Cloud application server 820 and database system 830 may comprise cloud-based compute resources, such as virtual machines, allocated by a public cloud provider. As such, cloud application server 820 and database system 830 may be subjected to demand-based resource elasticity. Each of the user device 810, cloud server 820, on-premise application server 825, and database system 830 may include a processing unit 835 that may include one or more processing devices each including one or more processing cores. In some examples, the processing unit 835 is a multicore processor or a plurality of multicore processors. Also, the processing unit 835 may be fixed or it may be reconfigurable. The processing unit 835 may control the components of any of the user device 810, cloud server 820, on-premise application server 825, and database system 830. The storage devices 840 may not be limited to a particular storage device and may include any known memory device such as RAM, ROM, hard disk, and the like, and may or may not be included within a database system, a cloud environment, a web server or the like. The storage 840 may store software modules or other instructions/executable code which can be executed by the processing unit 835 to perform the method shown in FIGS. 2/7. According to various embodiments, the storage device 840 may include a data store having a plurality of tables, records, partitions and sub-partitions. The storage device 840 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A method comprising:
receiving a request initiated by a user action;
converting the request to a plurality of OData calls;
generating an automate for an application under test based on the plurality of OData calls by recording one or more user actions for the application under test;
retrieving the automate for the application under test, the application under test including a user interface displaying at least one web object, the automate including UI-mode executable data and UI-less mode executable data;
executing the automate comprising:
(i) identifying a first Open Data Protocol (OData) call in the automate, wherein the automate includes the plurality of OData calls and the OData calls represent a collection of data based on a user interaction with a user interface;
(ii) mapping at least one test data value for the web object to a corresponding parameter in the OData call, wherein the mapping is via a mapping logic algorithm that maps sequential dependencies between the plurality of OData calls; and
(iii) executing the at least one OData call with the mapped at least one test data value, wherein execution of the at least one OData call outputs a response.

2. The method of claim 1, wherein execution of the first OData call outputs the response, and the response is transmitted to a second OData call.

3. The method of claim 2, wherein receipt of the response of the first OData call received by an automation tool initiates execution of the second OData call.

4. The method of claim 1, wherein:
the request includes data provided by the user and user action data;
the plurality of OData calls includes a first OData call and a second OData call;
the plurality of the OData calls is stored; and
the automate is generated based on the stored plurality of OData calls.

5. The method of claim 4, further comprising:
sequentially binding the second OData call to follow the first OData call, wherein the sequential binding is via a mapping of an output of the first OData call as an input to the second OData call.

6. A system comprising:
a memory storing processor-executable program code of a test automation module; and
a processing unit to execute the processor-executable program code to cause the system to:
receive a request initiated by a user action;
convert the request to a plurality of OData calls;
generate an automate for an application under test based on the plurality of OData calls by recording one or more user actions for the application under test;
retrieve the automate for the application under test, the application under test including a user interface displaying at least one web object, the automate including UI-mode executable data and UI-less mode executable data;
execute the automate, wherein execution of the automate further comprises:
identifying at least one Open Data Protocol (OData) call in the automate;
mapping at least one test data value for the web object to a corresponding parameter in the OData call, wherein the mapping is via a mapping logic algorithm that maps sequential dependencies between a plurality of OData calls; and
executing the at least one OData call with the mapped at least one test data value, wherein execution of the at least one OData call outputs a response.

7. The system of claim 6, wherein the OData call represents a collection of data based on a user interaction.

8. The system of claim 6, wherein the response is saved in a temporary storage.

9. The system of claim 8, wherein at least two OData calls are identified including a first OData call and a second OData call.

10. The system of claim 9, wherein execution of the first OData call outputs the response, and the response is transmitted to the second OData call.

11. The system of claim 10, wherein receipt of the response of the first OData call received by automation tool initiates execution of the second OData call.

12. The system of claim 9, wherein the first OData call and the second OData call are executed sequentially.

13. The system of claim 6, wherein:
the request includes data provided by the user and user action data;
the OData calls include a first OData call and a second OData call;
the plurality of the OData calls is stored per processor-executable program code; and
the automate is generated based on the stored plurality of OData calls.

14. The system of claim 13, further comprising processor-executable program code to cause the system to:
sequentially bind the second OData call to follow the first OData call.

15. The system of claim 14, wherein the sequential binding is via a mapping of an output of the first OData call as an input to the second OData call.

16. A non-transitory, computer readable medium having executable instructions stored therein to perform a method, the method comprising:
receiving a request initiated by a user action;
converting the request to a plurality of OData calls;
generating an automate for an application under test based on the plurality of OData calls by recording one or more user actions for the application under test;
retrieving the automate for the application under test, the application under test including a user interface displaying at least one web object, the automate including UI-mode executable data and UI-less mode executable data;
executing the automate comprising:
(i) identifying a first Open Data Protocol (OData) call in the automate, wherein the automate includes the plurality of OData calls and the OData call represents a collection of data based on a user interaction with a user interface;

(ii) mapping at least one test data value for the web object to a corresponding parameter in the OData call, wherein the mapping is via a mapping logic algorithm that maps sequential dependencies between the plurality of OData calls; and (iii) executing the at least one OData call with the mapped at least one test data value, wherein execution of the at least one OData call outputs a response.

17. The medium of claim 16, wherein:

the request includes data provided by the user and user action data;

the plurality of OData calls includes a first OData call and a second OData call;

the plurality of the OData calls is stored; and the automate is generated based on the stored plurality of OData calls.

* * * * *